US011468500B2

(12) United States Patent
Roesbery et al.

(10) Patent No.: US 11,468,500 B2
(45) Date of Patent: Oct. 11, 2022

(54) OPTIMIZED PLANOGRAMS

(71) Applicant: Blackhawk Network, Inc., Pleasanton, CA (US)

(72) Inventors: Dan Roesbery, Dublin, CA (US); Anders Gjerde, Pleasanton, CA (US)

(73) Assignee: Blackhawk Network, Inc., Pleasanton, CA (US)

(*) Notice: Subject to any disclaimer, the term of this patent is extended or adjusted under 35 U.S.C. 154(b) by 868 days.

(21) Appl. No.: 14/710,286

(22) Filed: May 12, 2015

(65) Prior Publication Data

US 2015/0324725 A1 Nov. 12, 2015

Related U.S. Application Data

(60) Provisional application No. 61/992,187, filed on May 12, 2014.

(51) Int. Cl.
*A47F 3/00* (2006.01)
*G06Q 30/06* (2012.01)
*G06Q 10/06* (2012.01)

(52) U.S. Cl.
CPC ... *G06Q 30/0639* (2013.01); *G06Q 10/06393* (2013.01)

(58) Field of Classification Search
None
See application file for complete search history.

(56) References Cited

U.S. PATENT DOCUMENTS

| 7,664,681 | B1* | 2/2010 | Oliveau | G06Q 30/02 705/26.1 |
|---|---|---|---|---|
| 10,592,855 | B2* | 3/2020 | Griffin | G06K 9/00771 |
| 2004/0011866 | A1* | 1/2004 | Saad | G06Q 30/02 235/380 |
| 2006/0249570 | A1* | 11/2006 | Seifert | G06Q 20/10 235/380 |
| 2007/0288296 | A1* | 12/2007 | Lewis | G06Q 30/02 186/52 |
| 2010/0025462 | A1* | 2/2010 | Schultz | A45C 11/18 235/380 |
| 2010/0030667 | A1* | 2/2010 | Chudy | G06F 19/3462 705/28 |
| 2012/0022913 | A1* | 1/2012 | Volkmann | G06Q 10/087 705/7.29 |

(Continued)

OTHER PUBLICATIONS

Blackhawk Network Apr. 2014 Road Show Presentation—Final Fair Disclosure Wire [Linthicum] Apr. 1, 2014. available at https://dialog.proquest.com/professional/docview/1516468796/fulltext/1797D0ACF786339F69B/4?accountid=131444 (Year: 2014).*

(Continued)

*Primary Examiner* — Folashade Anderson
(74) *Attorney, Agent, or Firm* — Barnes & Thornburg LLP; Jerry C. Harris, Jr.

(57) ABSTRACT

Systems and methods disclosed herein relate to the selection of planogram templates for display in retail stores and in online retail environments and the automatic selection, assignment, and monitoring of items assigned to locations in those templates. Additionally, planogram templates, product assortments, and assignments may be dynamically updated in real time based upon feedback and other factors.

10 Claims, 15 Drawing Sheets

(56) References Cited

U.S. PATENT DOCUMENTS

| | | | |
|---|---|---|---|
| 2013/0226826 A1* | 8/2013 | Hathaway | G06Q 30/02 705/348 |
| 2013/0325638 A1* | 12/2013 | Auclair | G06Q 30/0639 705/14.72 |
| 2014/0025420 A1* | 1/2014 | Joshi | G06Q 10/06313 705/7.23 |
| 2014/0114800 A1* | 4/2014 | Levitt | G06Q 30/02 705/26.8 |
| 2014/0201040 A1* | 7/2014 | Birch | G06F 3/147 705/28 |
| 2015/0166210 A1* | 6/2015 | Schram | G06Q 90/00 705/500 |
| 2016/0335586 A1* | 11/2016 | Panchamgam | G06Q 10/087 |
| 2018/0005035 A1* | 1/2018 | Bogolea | B25J 9/1664 |
| 2018/0027992 A1* | 2/2018 | Schiffman | A47F 10/00 |
| 2018/0260767 A1* | 9/2018 | Findlay | G06Q 10/087 |
| 2019/0034861 A1* | 1/2019 | Gaur | G06Q 10/087 |
| 2019/0236528 A1* | 8/2019 | Brooks | G06Q 10/06315 |
| 2019/0244436 A1* | 8/2019 | Stansell | G06F 3/0482 |

OTHER PUBLICATIONS

Filing receipt and specification for provisional patent application entitled "Optimized Planogram Generation," by Dan Roesbery, et al., filed May 12, 2014 as U.S. Appl. No. 61/992,187.

* cited by examiner

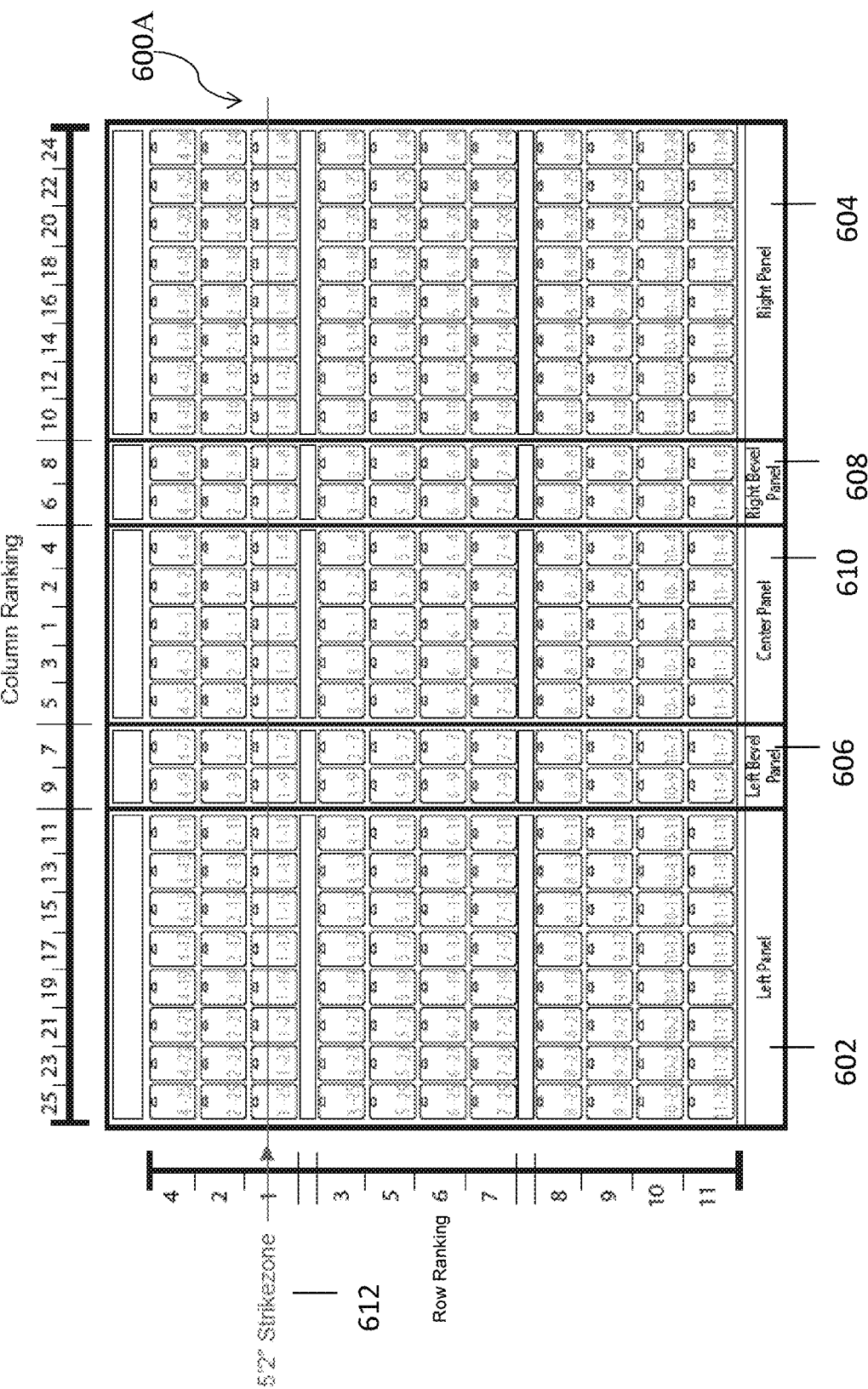

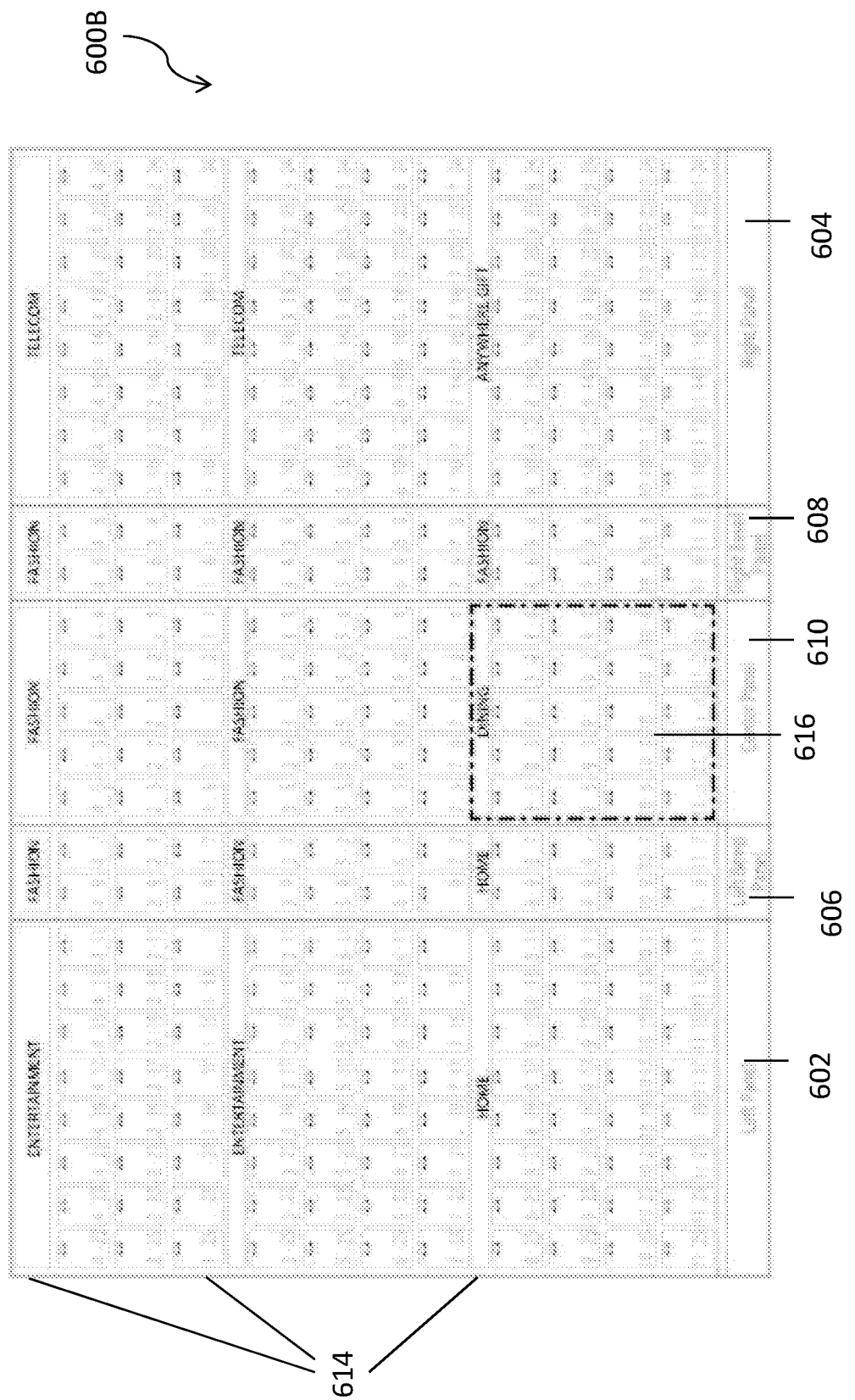

FIG. 7A – Product Scoring

700A

| Product | Brand | CPI Score | Placement |
|---|---|---|---|
| Jerry's Bar 25 | Jerry's Bar | 30.0 | G |
| Coffee, Inc. 25 | Coffee, Inc. | 25.0 | H |
| ScottBrews 40 | ScottBrews | 24.0 | K |
| Cookietime 75 | Cookietime | 23.0 | L |
| Jones Cheese 50 | Jones Cheese | 20.0 | P |
| Rodney's Ribs 100 | Rodney's Ribs | 18.0 | I |
| Coffee, Inc. 40 | Coffee, Inc. | 17.0 | B |
| Jerry's Bar 50 | Jerry's Bar | 14.0 | N |
| WestWings 75 | WestWings | 13.0 | O |
| Pizzalicious 75 | Pizzalicious | 11.5 | M |
| EggsnStuff 25 | EggsnStuff | 11.0 | D |
| Rodney's Ribs 50 | Rodney's Ribs | 10.0 | R |
| Jerry's Bar Multipack 40 | Jerry's Bar | 9.5 | C |
| Cookietime 25 | Cookietime | 9.0 | J |
| EggsnStuff Etc. 50 | EggsnStuff | 8.0 | A |
| ScottBrews Multipack 15 | ScottBrews | 7.0 | F |
| Pizzalicious 25 | Pizzalicious | 6.0 | E |
| Jones Cheese 100 | Jones Cheese | 3.0 | T |
| WestWings 200 | WestWings | 2.0 | Q |
| Rodney's Ribs 30 | Rodney's Rifles | 0.5 | S |

FIG. 7B – Brand (Product Family) Scoring

700B

| Brand | Aggregate Score | ACP Priority | Product Count | Placement |
|---|---|---|---|---|
| Jerry's Bar | 53.5 | 1 | 3 | G, N, C |
| Coffee, Inc. | 45.0 | 2 | 2 | H, B |
| Cookietime | 40.0 | 3 | 2 | L, J |
| ScottBrews | 31.0 | 4 | 2 | K, F |
| Rodney's Ribs | 28.5 | 5 | 3 | I, R, S |
| Jones Cheese | 23.0 | 6 | 2 | P, T |
| Pizzalicious | 17.5 | 7 | 1 | M, E |
| WestWings | 15.0 | 8 | 2 | O, Q |
| EggsnStuff | 11.0 | 9 | 2 | A, D |

FIG. 7C – Product Assignment

| | | DINING | | |
|---|---|---|---|---|
| E<br>Pizzalicious<br>25<br>8 – 5 | C<br>Jerry's Bar<br>Multipack 40<br>8 – 3 | A<br>EggsnStuff<br>50<br>8 – 1 | B<br>Coffee, Inc.<br>40<br>8 – 2 | D<br>EggsnStuff<br>. 25<br>8 – 4 |
| J<br>Cookietime<br>25<br>9 – 5 | H<br>Coffee,<br>Inc. 25<br>9 – 3 | F<br>ScottBrews<br>Multipack 15<br>9 – 1 | G<br>Jerry's<br>Bar 25<br>9 – 2 | I<br>Rodney's<br>Ribs 100<br>9 – 4 |
| O<br>WestWings<br>75<br>10 – 5 | M<br>Pizzalicious<br>75<br>10 – 3 | K<br>ScottBrews<br>40<br>10 – 1 | L<br>Cookietime<br>75<br>10 – 2 | N<br>Jerry's<br>Bar 50<br>10 – 4 |
| T<br>Jones<br>Cheese 100<br>11 – 5 | R<br>Rodney's<br>Ribs 50<br>11 – 3 | P<br>Jones<br>Cheese 50<br>11 – 1 | Q<br>WestWings<br>200<br>11 – 2 | S<br>Rodney's<br>Ribs 30<br>11 – 4 |

Performance Value Inputs- Store Level

902

|  | 13 Week | 26 Week | 52 Week |
|---|---|---|---|
| Unit Sales | 5 | 7 | 20 |
| Load Value Sales | $250 | $350 | $1,000 |
| Gross Profit | $13 | $18 | $50 |

CPI Weighting- Store Level

904

|  | 13 Week | 26 Week | 52 Week |
|---|---|---|---|
| Unit Sales | 15% | 10% | 5% |
| Load Value Sales | 20% | 15% | 10% |
| Gross Profit | 10% | 10% | 5% |
| Unit Sales Output | 0.01 | 0.01 | 0.00 |
| Load Value Sales Output | 0.01 | 0.01 | 0.01 |
| Gross Profit Output | 0.01 | 0.01 | 0.00 |

906 — Performance Value Inputs- Division Level

|  | 13 Week | 26 Week | 52 Week |
|---|---|---|---|
| Unit Sales | 250 | 500 | 1200 |
| Load Value Sales | $12,500 | $25,000 | $60,000 |
| Gross Profit | $625 | $1,250 | $3,000 |

908 — CPI Weighting- Division Level

|  | 13 Week | 26 Week | 52 Week |
|---|---|---|---|
| Unit Sales | 15% | 10% | 5% |
| Load Value Sales | 25% | 15% | 5% |
| Gross Profit | 10% | 10% | 5% |
| Unit Sales Output | 0.01 | 0.01 | 0.00 |
| Load Value Sales Output | 0.02 | 0.01 | 0.00 |
| Gross Profit Output | 0.01 | 0.01 | 0.00 |

FIG. 9C

_Total Category Performance Value Inputs- Store Level_

|  | 13 Week | 26 Week | 52 Week |
|---|---|---|---|
| Unit Sales | 100 | 110 | 250 |
| Load Value Sales | $5,000 | $5,500 | $12,500 |
| Gross Profit | $250 | $275 | $625 |

910

_Total Category Performance Value Inputs- Division Level_

|  | 13 Week | 26 Week | 52 Week |
|---|---|---|---|
| Unit Sales | 3500 | 6000 | 16000 |
| Load Value Sales | $175,000 | $300,000 | $800,000 |
| Gross Profit | $8,750 | $15,000 | $40,000 |

- Store CPI Weight — 40%
- Division CPI Weight — 60%

- *Store CPI 1* — 6.08
- *Division CPI 1* — 7.61

- *Blended CPI 1* — 7.00

- Growth Rate — 110%

- Store CPI 2 — 7.70
- Division CPI 2 — 8.37

- Store Proximity Score — 120%

- CPI 3 — 9.24

OPTIMIZED PLANOGRAMS

CROSS-REFERENCE TO RELATED APPLICATIONS

This application claims priority to and incorporates in its entirety herein U.S. Provisional Patent Application No. 61/992,187, "Optimized Planogram Generation," filed May 12, 2014.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The disclosure generally relates to the display of electronic stored-value cards in electronic transactions.

BACKGROUND

Retail locations may use in-store displays and advertisements to introduce new products, sell off products with excess inventory, or otherwise structure the displays to maximize sales and minimize inventory costs.

SUMMARY

In an embodiment, a method of automatically selecting and assigning products to a planogram map template comprising: storing, in a data store on a server, a plurality of planogram map templates, wherein each template of the plurality of planogram map templates comprises a plurality of regions, wherein each region comprises a plurality of positions and at least one constraint, and wherein the at least one constraint is one of a locked status, a brand, a value, a category, a position, a display season, and a display location; receiving, by an application on the server, a request to generate a planogram; assigning, by the application, in response to receiving the request, at least some prepaid cards of a plurality of available prepaid cards to a first template of the plurality of planogram map templates, wherein the assignment is based upon the at least one constraint and at least one of a brand associated with a prepaid card, a value associated with the prepaid card, a category associated with the prepaid card, categories associated with other prepaid cards of a plurality of prepaid cards assigned to the template, a brand associated with a region on at least one region on the template, a category associated with the at least one region on the template, a relationship between the prepaid card and at least one other assigned prepaid card, and a performance history, and wherein the plurality of prepaid cards assigned to the template is a subset of the plurality of available prepaid cards; and generating, based on the assignment, a planogram comprising the assignment of the plurality of prepaid cards assigned to the first template.

In an embodiment, a product display comprising: a plurality of items assigned to a first planogram template, wherein the first planogram template is selected based upon at least one of the season, the display type, the display location, a number of items to display, and the predetermined occupation percentage, wherein the first planogram template comprises a plurality of regions, wherein at least one constraint on item assignment is associated with at least one region of the plurality of regions, wherein each item is associated with an index, and wherein each item of the plurality of items is associated with a category, a brand, and a load value, wherein the index is based upon a plurality of factors, wherein the plurality of factors comprises at least two of a number of units sold during a predetermined time period, a load value associated with the number of units sold during the predetermined time period, a net revenue associated with the number of units sold during the predetermined time period, a product commission, a product approval, and a regulatory restriction, wherein at least some items of the plurality of items is assigned to the first planogram template of a plurality of templates based upon at least the index and a plurality of rules, wherein the plurality of rules is associated with at least one of the first planogram template, a season, a display type, a position of at least on other item, a predetermined occupation percentage, and a display location.

In an embodiment, a method of automatically selecting and assigning products to a planogram, comprising: defining, by an application stored in a non-transitory memory of a server and executable by a processor, a strike zone on a planogram template comprising a first panel, wherein the strike zone comprises a plurality of locations on the first panel; ranking, by the application, a first plurality of rows and a first plurality of columns, wherein ranking comprises: assigning, by the application, to a first row of the plurality of rows a first rank, assigning, by the application, to a second row of the plurality of rows, a second rank, wherein the first row is located above and adjacent to the strike zone and the second row is located below and adjacent to the strike zone, assigning, by the application, to a third row of the plurality of rows, a third rank, wherein the third row is located above and adjacent to the first row, assigning, by the application, to a fourth row of the plurality of rows, a fourth rank, wherein the fourth rank is located below and adjacent to the second row, assigning, by the application, to the planogram template based upon the ranking of at least one of the plurality of rows and the plurality of columns, at least some of a plurality of products based upon an index value associated with each product of the plurality of products, and at least one of the ranking of the plurality of columns and the ranking of the plurality of rows.

LISTING OF FIGURES

FIG. 6A is an illustration of an end-cap display according to certain embodiments of the present disclosure.

FIG. 6D is an illustration of an embodiment of an optimized planogram according to certain embodiments of the present disclosure.

FIGS. 7A-7C are an example of assignment of a plurality of items to a planogram template to create an optimized planogram according to certain embodiments of the present disclosure.

FIGS. 9A-9D illustrate portions of a spreadsheet according to method that may be used to determine an index value for a prepaid card according to certain embodiments of the present disclosure.

DISCUSSION OF DISCLOSED EMBODIMENTS

Figure 1:
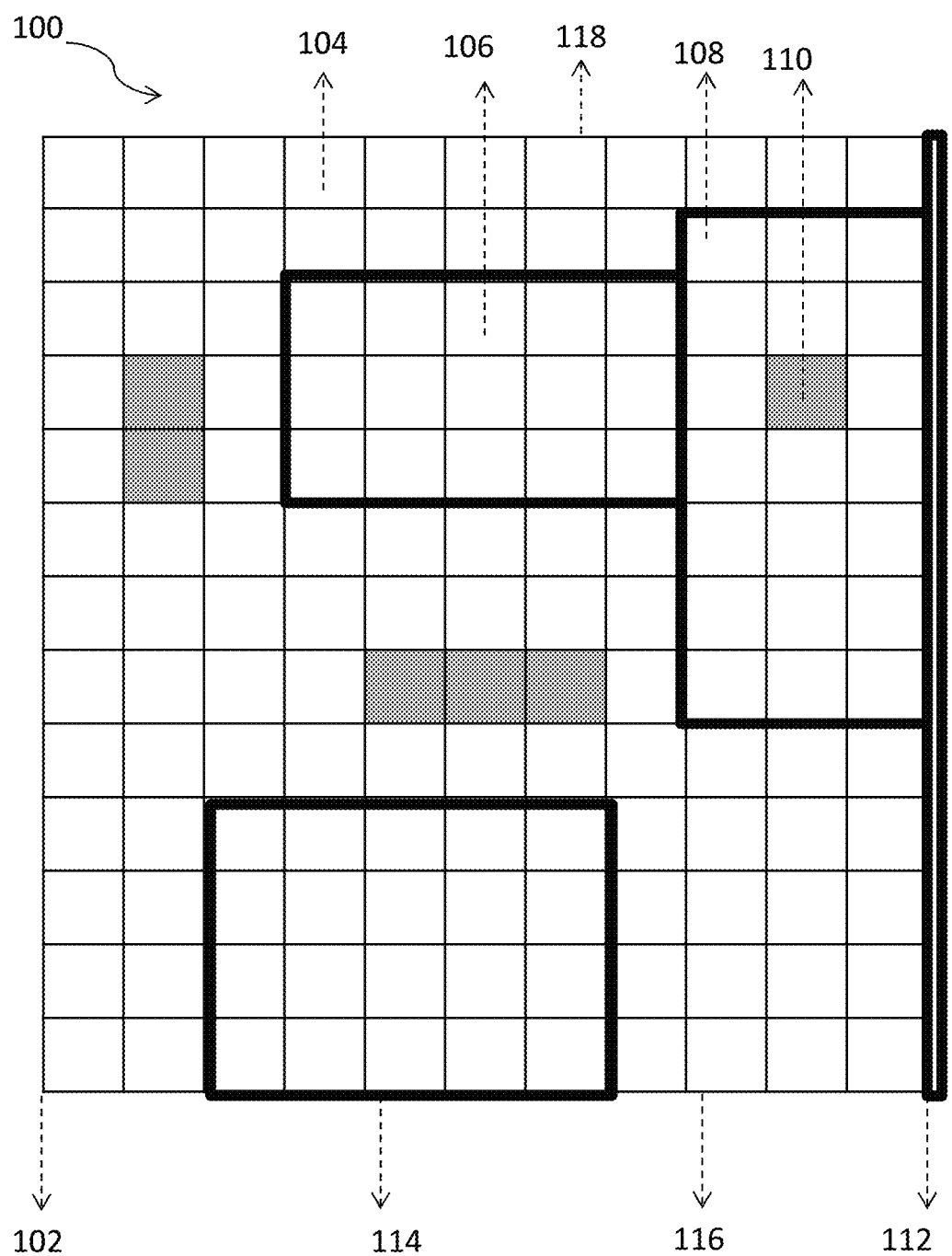
FIG. 1 is an embodiment of an optimized planogram template according to certain embodiments of the present disclosure.

In-store and online displays of goods and services for purchase are viewed by millions of consumers every day. The sales success of these displays may be associated with multiple factors, including the season, economy, as well as the layout of the displayed items. Therefore, the design of the display as well as the position of each item and the relative position of each item, may impact the sales volume of a particular item or family of items. In an embodiment, a planogram template may be used to generate display layout, and this template may be referred to a planogram template. A planogram is a map used to indicate where items should be placed, based upon historical information, contractual agreements with item owners, contractual agreements with display locations, and other factors, for in-store or on-line displays in order to maximize customer interest/satisfaction and associated sales. This placement process may be referred to as assignment, and an assortment or a subset of available products may be selected for assignment. The planogram map generated when products are automatically assigned to an optimized planogram template may be referred to as an "optimized planogram," a "display scenario," or "display," and a display, virtual or otherwise, maybe configured to provide further data about assigned products prior to and at the point of sale. As used herein, the term "optimized" may be employed to describe a planogram template that has been generated for a particular display location, type, season, or combinations thereof. In an embodiment, a template may be set up by a distribution partner (e.g., owner or other party associated with a display location or region of display locations) and the selection of products, for example based upon the index values/final index values and placement of those products on to the optimized template is an automated, dynamic process where the products available for selection as well as the index values/final index values may be updated (including the addition of new products and the obsoleting of products) on a dynamic, real-time basis as the availability and display/sales information changes over time. In contrast, convention systems employ manual selection and placement. The discussed systems and methods enable the real-time, dynamic generation of in-store and online displays by automatically selecting and assigning products to planogram template maps, and by updating the template maps, product pools, and assignments in real-time using feedback, for example, from sensors in real-world store displays, data from virtual displays, and consumer profiles and/or accounts associated with, for example, previous purchases.

Using the systems and methods disclosed herein, an optimized planogram, which may be referred to as an automated planogram herein since the systems and methods herein may be employed to generate and modify both the product selection for display and the product placement on the display. An optimized planogram may be generated and used to assign a plurality of items to a plurality of positions and used to set up, revise, or otherwise maintain an in-store or online display.

In an embodiment, a plurality of items may be assigned to positions, which may be referred to as pegs, on a planogram template, using a plurality of rules, restraints, and factors/inputs associated with individual items and/or aspects (i.e. brand, category, etc.) of each the plurality of items. In one embodiment, the generation of a planogram may comprise: (1) determining a base index number, (2) modifying that base index number to generate a modified base index number, (3) selecting a planogram template, (4) determining an assortment selection of the plurality of items, e.g., all of the items of the plurality of items may or may not be assigned to a particular planogram template, and (5) determining a final index value. These steps may be completed in various orders depending upon the embodiment.

A plurality of values including but not limited to a base index, a modified index, and a final index, are associated with and determined for at least one of an individual item (e.g., for at least some of the items of the plurality of items), a category, a sub-category, or a brand. The plurality of items may be pre-paid cards (refillable or single use), handbags, other accessories, electronics, furniture, apparel, perishables, other food items, household goods, appliances, and other items that may be sold in retail or wholesale locations including online vendors.

In an embodiment, the base index number, the modified base index number, and the final index value may be used to determine placement of items on a planogram template. In some embodiments, the base index may be used, in others, the modified base index may be used, and in still other embodiments the final index value may be used. Various combinations of these indexes may also be utilized. The planogram template may be selected based upon a plurality of factors including the location of the display within a structure such as a mall, store, stadium, airport, virtual location, or parking lot, as well as the display season, the display geometry, the display duration, the location of the display (target demographic/traffic of the location), combinations thereof, or other factors that may impact, positively or negatively, the sales of displayed items.

In an embodiment where the plurality of items are prepaid (single use or refillable) gift cards, each card may be associated with each of a brand, a category, a subcategory, a load value, use restrictions. In an embodiment, the use restrictions include but are not limited to a use-by date, an identification number, a passcode or PIN number, a value differentiation, and other card features as appropriate for the particular brand. In an embodiment, the category may be, for example, apparel, food, beauty, music, general use (i.e. Visa or American Express), electronics, or big-box stores. A category may comprise sub-categories, which in the case of the category of apparel may comprise sporting apparel, formal apparel, casual apparel, themed apparel, holiday apparel, wedding apparel, footwear, accessories, etc. Sub-categories of the food category may comprise fast food, quick serve, seated, formal, grocery, and specialty. A "brand" may be a specific brand or may be an umbrella of brands, for example, a card brand on the face of a prepaid card may be ACME, and the card may therefore be used at any store under the ACME umbrella. In alternate embodiments, the same card may be used instead at select brands or may be used at specific stores under the ACME umbrella as indicated on the face of the card itself or account data in an account associated with the card. As discussed below, a planogram template may have a plurality of constraints (which may be referred to as relational constraints if associated with the position of one card in relation to at least one other) and rules assigned to and applied to each template. These constraints and rules may be based upon the brand, category, sub-category, load value, and other data associated (sales history, commission, etc.) with the cards as discussed in detail below, including quick response (QR) codes which may be scanned by portable electronic devices. In some embodiments, the constraints may be the result of contractual agreements between the distributor and the vendor, and in other embodiments, the constraints may be based upon state, local, federal, or other regulatory requirements.

With respect to the first step in this embodiment, determining a base index number, a base index number is dynamically established for each item of a plurality of items that may also be referred to as a pool of items. The pool of factors (which may also be referred to as inputs) that may be selected in various combinations depending up on the embodiment and used to determine this base index number may comprise the number of units sold at a plurality of calendar intervals, the load value of the number of units sold at the plurality of calendar intervals, and a net revenue of the number of units sold at the plurality of calendar intervals. A load value comprises the value associated with a pre-paid (single use or refillable) card, that is, the value on the face of the card. A load value may be considered "high" or "low" as compared to other load values of the same or similar/related brand, category, sub-category, or combinations thereof. The net revenue comprises the revenue generated for the sale of the card, e.g., a $100 load value card may have a 10% commission, which may be split between the entity who owns the card brand and the distribution partner. In some embodiments, the plurality of calendar intervals may be 13, 26, and 52 weeks, and in alternate embodiments there may be more or less intervals of longer or shorter duration. The selected factors may be analyzed to determine a base index number for an item of a plurality of items as discussed herein. An item, which may also be called a "product" and may be a good or may be representative of a service, is a unique item usually represented by a UPC or ProductId number comprising product attributes which normally include, name, manufacturer, category, height width and depth.

Turning to a second step in this embodiment, modifying the base index number to generate a modified base index number, the base index number may be dynamically modified after it is initially generated. The base index number may be modified due to at least one factor of a plurality of factors comprising: new or re-introduced products, applicable federal or state legal restrictions, future growth or contraction of the brand or category. The modification may occur based upon an analysis of these or other factors and, if it is determined that a modification of the base index number is appropriate, may be modified using any combination of a lift factor, a new product index, a current planogram-ed store count by an approval-level entity such as a distribution partner, a store-level mapping and associated mappable flag, proximity weighting tables, a score override feature, and a previous performance (card sales) history. In an embodiment, an approval-level entity may comprise a person or organization that approves template selection and/or item placement. This may be a parent company, a subsidiary, a division, or other organizational-level or job-title-level. A proximity weighting table is a table that references the store-level mapping (i.e. the store location) in order to determine the nearest location where a particular card can be redeemed. For example, if a particular Italian restaurant chain does not have any locations within 500 miles of a store location, the cards for that chain may not be selected for assignment. In some embodiments, the state legal restrictions referenced above may comprise regulations such as what cards can be sold in a state based upon what retails are present in that state. The lift factor may be based upon factors including some or all of business conditions in a particular category, press related to particular brands, new product launches, product recalls, cards being phased out, new card rollouts, or other events that may increase or decrease the sales or urgency for sale (i.e. brand obsoleting/mergers and acquisitions of business entities associated with a brand or brands) of a particular card.

Turning to the third step in the embodiment, selecting a planogram template and determining an assortment selection of the plurality of items, in this step, at least some of a plurality (pool) of items is selected for potential assignment to a planogram template. All of the items of the plurality of items may or may not be assigned to a particular planogram template. In some cases, a subset of the pool of items based upon the base index or the modified base index associated with each card, and at least one of a second-facing logic, and a number of pegs per category in a region of a template or in an entire template. In addition, in some embodiments, there may be a manual placement option that may be based, for example, on contractual agreements, a predetermined minimum or maximum number or percentage of pegs for a brand per category, current planogram models, success of current planogram models, and release type.

Second facing logic is the logic that may be applied to at least some card assignments that is based on the other cards that a particular card is assigned within a predetermined proximity to. For example, if card X is assigned to a first peg, and card X is associated with the category of food and the subcategory of fast food, there may be restrictions on what cards may be placed in proximity to that card, and/or card X and/or cards associated with the same brand, category, sub-category, load value, or other aspects of the assigned card.

In some embodiments, card X may be assigned to the pool during this step, but not assigned to an actual position, which may instead occur in a subsequent step. In an embodiment, a manual placement option may be available and may be employed based on contractual agreements, for example, an agreement with Coffee, Inc., that cards from Coffee, Co., will not be placed in the same row, column, or within other proximity of Coffee, Inc., cards. In an alternate embodiment, the contractual agreement may establish a maximum number or percentage of Coffee, Co.'s cards that can be present in the same display as Coffee, Inc.'s cards. Conversely, Coffee, Inc. may have locations in Big-box Store A and Bookstore Chain A, so Coffee, Inc. may have a contractual agreement with the distribution partner that Big-box Store A and Bookstore Chain A have positions within a predetermined proximity of the position or positions of Coffee, Inc. cards either because it has been found to increase sales of one or both cards, or because there is a common owner or other agreement in place, or based upon predictive modeling that it will do as such.

Turning to the fourth step in this embodiment, determining a final index value, some factors that may be selected to determine the final index value are the product selection in the third step (i.e. how desirable is the product?), product attributes such as the category, sub-category, load value, form of value, and other attributes and factors as discussed above. In addition to the above factors, there may be user-defined category dimensions and space dimensions as well as display fixture (position) attributes including a strike-zone identified by individual pegs or by row/column position, and/or by the attributes of surrounding cards or as-yet-unfilled template positions associated with attributes. The display fixtures may comprise shelves, pegboards, notch bars, or other aspects of the planogram. The "user" in this case may be the distribution partner, the owner of the store where the display is located, or a combination of both and/or other third parties. In addition, the product placement in relation to other cards that are assigned to an optimized planogram (e.g., automatic product assignment to a planogram template) may impact the final index, as may the aggregated index value that may be determined by brand. This value may also be determined by row (facing), column, segment (a vertically divided portion of planogram), or zone/region. As discussed herein, each planogram template may comprise a plurality of regions that may be premium, discount, or otherwise location-based regions which may impact a final index value for a prepaid card or other item.

In alternate embodiments, additional factors may be employed to determine item placement on a planogram template. For example, each item may be assigned a ProductID, a margin, a rank, a geo-location, an ExpectedSalesUnit, ProductType, ProductValue, universal purchase code (UPC), and the stock keeping unit (SKU). The ProductID may be a unique identifier assigned to each item, and the margin may be the profit margin, e.g., the difference between revenue and cost, associated with the ProductID, brand, category, or other item aspect. The geo-location may be another way of describing the location of an object, e.g., the real-world geographic location, and/or the proximity of a retail location, e.g., a product display, where an item is sold to a location where the item may be redeemed. In some embodiments, triangulation or quadlateration may be used to determine the location of an object using the distances or measures of time of flight from three or four locations, respectively. The ExpectedSalesUnit may be a number of units that are expected to sell in a given time period based upon historical data for the item and/or for items related by, for example, brand or category. The ProductType may be a grouping of similar kinds of products or services, e.g., a brand and/or category. The ProductValue is an assessment of worth of a good or service (such as a gift card for goods or services). In some embodiments, the ProductValue may be a value assessment which may be higher or lower than the load value depending upon what other constraints and/or rules are applied to a particular item. In some embodiments, a preference score and/or a merchant score may be used to modify an index value. A merchant preference may be a weighting or scoring that reflects a preference of the merchant, i.e., a preference of the owner or other managing entity of the location where the planogram display is located. A preference score may comprise a weighting or other number that is associated with a product, that is, other products, categories, brands, or other aspects of items that a product would preferably be situated adjacent to or away from depending upon the optimized planogram utilized.

It is appreciated that a display (and the corresponding optimized planogram) may be rectangular, square, circular, spherical, cube, or other 2D or 3D array, and that a set of logic or rules may be applied generally to optimized planograms. These rules and/or logic may comprise, for example, that the mix of products between brand, category, and sub-category as well as load value and in some cases commission structure is weighted more heavily than peg placement, and that the best performing brands and cards, as determined by the index calculations, may be placed in rows/columns nearest to the target or strike zone. In an embodiment, may be a "preference" for the vertical placement of brands as opposed to the horizontal or other type of placement, that is, there may be a contractually-defined premium or other term that gives particular card-owners (retailers) or display locations (or both) placement in a more preferable location, a location that may have been determined to be a more visible and/or higher sales volume location (placement) based upon historical data. Other rules/constraints may include that cards with a higher domination with a brand selection based upon a comparatively high final index may be placed closer to the target or strike zone, that the acceptable card grouping by brands may be ranked by formation, that space is to be filled from the highest point on the display to the lowest based upon the cumulative final index of each brand, and that similar brands may be grouped based upon the sub-category associated with each brand if indicated as such during a flag set during the user release cycle initiation. The strike zone may be defined as a zone where it may be most desirable to have cards or other products assigned, and it may be defined by algorithm, dynamic analysis, contract, display location, or combinations thereof. A single display may comprise a plurality of panels, and each panel may have the same, different, or overlapping strike zones. For example, if a display is located at a family-oriented location, such as a mini-golf or go-cart attraction, it may comprise strike zones at levels and comprising content to adults, children, teens, and young adults, some, all, or none of which may be overlapping in location (pegs on the display) and/or categories and other product attributes as discussed herein.

Figure 5:
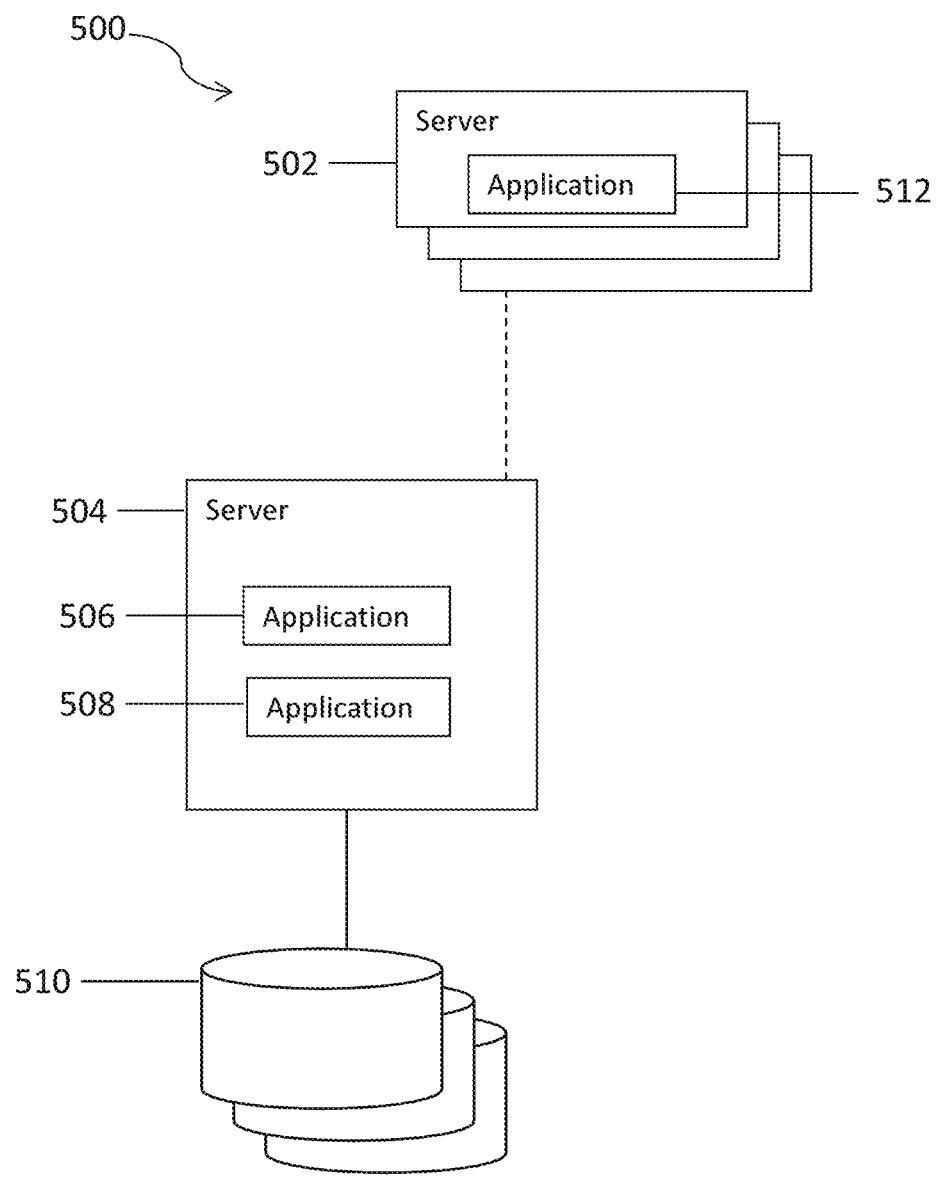
FIG. 5 is an illustration of a system 500 that may be capable of executing according to certain embodiments of the present disclosure.

When a new item is introduced to the pool of items, information about that item may be stored in a profile in a system such as the system discussed in FIG. 5. This is discussed in more detail below and may include a plurality of flags set for things like sub-category, similar brands, we well as other indications regarding aspects of the item that may impact its placement or the placement of other items in proximity to the new item. Using the systems and methods disclosed herein, optimized planograms can be generated for a wide array of seasons, display types, display configurations, and display locations that are used to maximize sales and create a positive customer experience where the customer's desired products are present and easily located. This will encourage customers to return to make further purchases and/or refill cards where refilling is an option.

Display purchases may be accomplished via email, SMS, video, instant message, a website, an online storage medium, a cloud storage system, or combinations thereof; presenting the digital sticker via email, SMS, video, instant message, a website, an online storage medium, a cloud storage system, which may be referred to as a cloud computing environment, or combinations thereof; or both. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

Virtual displays may also be employed according to the systems and methods herein, and may comprise aspects related to the display, arrangement, selection, and purchase. These aspects may comprise discounts for purchasing related products, e.g., cards with the same or related owners, brands, categories, sub-categories, etc., which may also be options in a real-world display, the virtual embodiment may enable the gamification of selection and purchase of products at least in that rebates or other incentives may be offered to consumers based upon information associated with a consumer's account. This information may comprise a purchase history, a primary location, a secondary location, a plurality of consumer-set preferences, a plurality of preferences based upon historical purchases and views of products and/or a plurality of products that may have been flagged or otherwise saved for future purchase.

In a real-world display, and as discussed in detail below, a plurality of sensors may be associated with peg locations of the display, and/or with the structure of the display itself. These sensors may be in communication with at least one remote server, including a cloud storage system, in order to detect and transmit information to the server to provide recommendations and incentives (offers) to consumers. The systems and methods discussed herein may employ cloud computing for some or all transactions, depending upon the embodiment. As such, with respect to the transmission of information by sensors, point-of-sale devices, and other devices discussed herein, this transmission may be accomplished at least in part by cloud computing.

The gamification and customer profile embodiments discussed above with respect to virtual displays may also be employed in real-world displays. For example, EMV (Eurocard, MasterCard, and Visa) chips, may be employed to sense cards that have already been purchased and that may be in the vicinity of the sensors. These sensors may be employed not only to sense which products removed, replaced, and/or purchased, but also may sense when a previously purchased (activated) product is within a predetermined range of the sensor(s). Products purchased from virtual and real-world displays may be tied/linked to consumer accounts. A sensor may determine not only at least a portion of information from a sensed, previously purchased card, but may also determine the consumer account (which may also be referred to as a profile and may permit users to set various brand, value, location, category, and other preferences) the previously purchased card is associated with. It is appreciated that a customer may have an account (e.g., a log in, password, and purchase history) but elect not to set up a profile with additional information as discussed above. In addition, similar to the virtual embodiment where a user may be logged in to their account or may log in during review and purchase of products, rebates or other incentives may be offered to consumers based upon information associated with a consumer's account when at least one previously purchased card is sensed that is associated with the consumer's account/profile. The previously purchased card may be sensed even if it has been used, and further even if it does not currently comprise a load value (e.g., the load value was used on purchases but the user kept the card).

In response to sensing at least one previously purchased card, at least some of the sensors associated with the pegs or other portions of the display (e.g., the structure of the display that holds the pegs) may indicate with light, sound, vibration, or combinations thereof in positions which may comprise products of interest to the consumer based upon information and/or preferences associated with their customer account or profile. In an embodiment, if a sensor associated with a peg or the display structure senses a previously purchased card within a predetermined range, but determines that the card is not associated with a consumer profile, the sensor may still transmit the card information to a server, including a cloud computing server, which may recommend additional products by flashing the sensor lights, sound, vibration, or combinations thereof, based upon at least some of the attributes associated with the sensed previously purchased card.

In an embodiment, these flashing sensors and the process of determining which sensor(s) to flash, the duration of flashing, and whether repeated flashing is desirable, may be based on retrospective predictions. That is, a recommendation engine may be in communication with the pegs comprising/associated with sensors (discussed herein as "smart pegs"), and may make retrospective predictions to the user based upon their previous purchase or purchases. In an embodiment where more than one previous purchase is sensed by one or more sensors, the server in communication with the sensors may be able to correlate these identified previous purchases. For example, if a person is walking around a display and different sensors pick up their movement and detect different previous purchases in their pocket, purse, or other location, the server, by way of an application, may be able to tie these sensed items together based upon their association with a consumer account and make recommendations and/or offers to the user based upon information read by the sensors.

FIG. 1 is an illustration of a planogram template 100 according to embodiments of the present disclosure. It is appreciated that the system, methods, and optimized planograms disclosed herein may utilize a plurality of planogram templates that may possess some, all, or additional features as compared to the planogram template 100. The planogram template 100 comprises a plurality of positions 104 that may be arranged in a plurality of rows (facings) and columns. The plurality of positions 104 may be referred to as "pegs," and while there are 11 columns and 13 rows in this example in FIG. 1, it is understood that other embodiments of planogram templates may have more or less rows or may be a different shape as appropriate for the display location. The display location for the assigned items as well as the season and an index associated with each item of a plurality of items may be used to assign at least some of the plurality of items to the plurality of positions 104 based upon the planogram template 100. The analysis discussed herein with respect to the embodiments of systems and methods is employed to generate and dynamically update a plurality of optimized planogram maps for use with a display or family of displays, or a store, a store brand, a store category, sub-category, or combinations thereof. This updating may be done in real time, in either a virtual or a real-world context.

In an embodiment, the planogram template 100 may comprise a top 118, a bottom 116, a first side 102 and a second side 112. In an embodiment, the top 118 and the bottom 116 may be reversed, and the second side 112 may be referred to as an end cap side, that is, the side of the in-store display that is intended to be closest to the end of an aisle in a store. In some locations, there may be an end cap display in contact with the second side 112 or the first side 102; this end cap display may also utilize a planogram to establish the item assignment. In one embodiment, the plurality of items assigned to the planogram template 100 are a plurality of gift (prepaid) cards that are each associated with an index that is used in combination with other factors such as season, display type, a locked position, and display season, to determine placement. It is understood that the display "type" may refer to the size, shape, position, and retail location where the display is located (which may also be specifically referred to as the "display location"), and that the display season may refer to the month and/or nearest/proximity to a holiday season during which the display will be utilized.

In an embodiment, the planogram template 100 may comprise a subset of positions 110 of the plurality of positions 104. This subset 110 may be referred to as a plurality of locked positions 110. A locked position comprises a position or positions on the planogram template 100 that have already been assigned to the planogram template and in some embodiments are a part of the planogram template 100. This assignment may be based upon contractual agreements with the display location or with the card originator (brand owner). In addition, there may also be constrained positions (not pictured) on the template which may have a plurality of rules associated with placement. This plurality of rules may relate to what brands, categories, sub-categories, or a number of cards from a brand, category, or subcategory may be placed in proximity to the constrained position or in a region of the constrained position. The plurality of the rules may be related, that is, rules associated with a first position may be associated with and/or based upon rules associated with a second position which may or may not be adjacent to the first position.

In some embodiments, the planogram template 100 may further comprise a plurality of rules associated with product mix and product placement that may be referred to as template constraints. These constraints may be based on the display location and/or the brand owner of the prepaid card(s).

In some embodiments, the locked position 110 may also have associated rules. For example, if a position has been locked for use to where only a card associated to a particular brand or brand family, there may be associated rules related to other competing brands that can be placed within a predefined proximity to that locked position 110, and/or rules related to the number of total cards that can be place on the template 100 for competing brands or other potentially competing or less desirable-in-combination categories. Conversely, in some embodiments, the associated rules may establish a brand or category preference, for example, if a locked position 110 is locked for a coffee provider, that provider may want its cards to be located near a bookseller or big-box store where its coffee shops may be located. The difference between a locked position 110 and a constrained position is that a locked position may be established in the template itself, or once a template is selected, and a constrained position may be constrained after other cards and/or locked positions 110 have been assigned to positions on the template.

In an embodiment, the planogram template 100 comprises a plurality of regions, for example, regions 106, 108, and 114. Region 106 may be referred to as the strike or target zone, that is, an area where the most traffic is seen. There may be one or more target zones in a planogram template, depending upon where the display is to be placed. For example, if a display is intended for a children's toy store, there may be a target region 106 that is parent-height and a target region (e.g. 114 as discussed below) that is lower than 106 that may have prepaid cards that would interest a child. Region 114 may be comprised of prepaid cards based upon previous sales history, a planned obsolescence, or may be a lower target region comprising prepaid cards that might appeal to children. Region 108 may be referred to as the near-end cap region, this may be a premium region (e.g. one where a higher commission is possible and/or where cards in those positions have a higher sale rate and/or a higher value) because consumers who may not intend to walk down the aisle to purchase anything may still look at the end of the display closest to the aisle or end cap side 112 or end cap display, if there is one.

Figure 2:
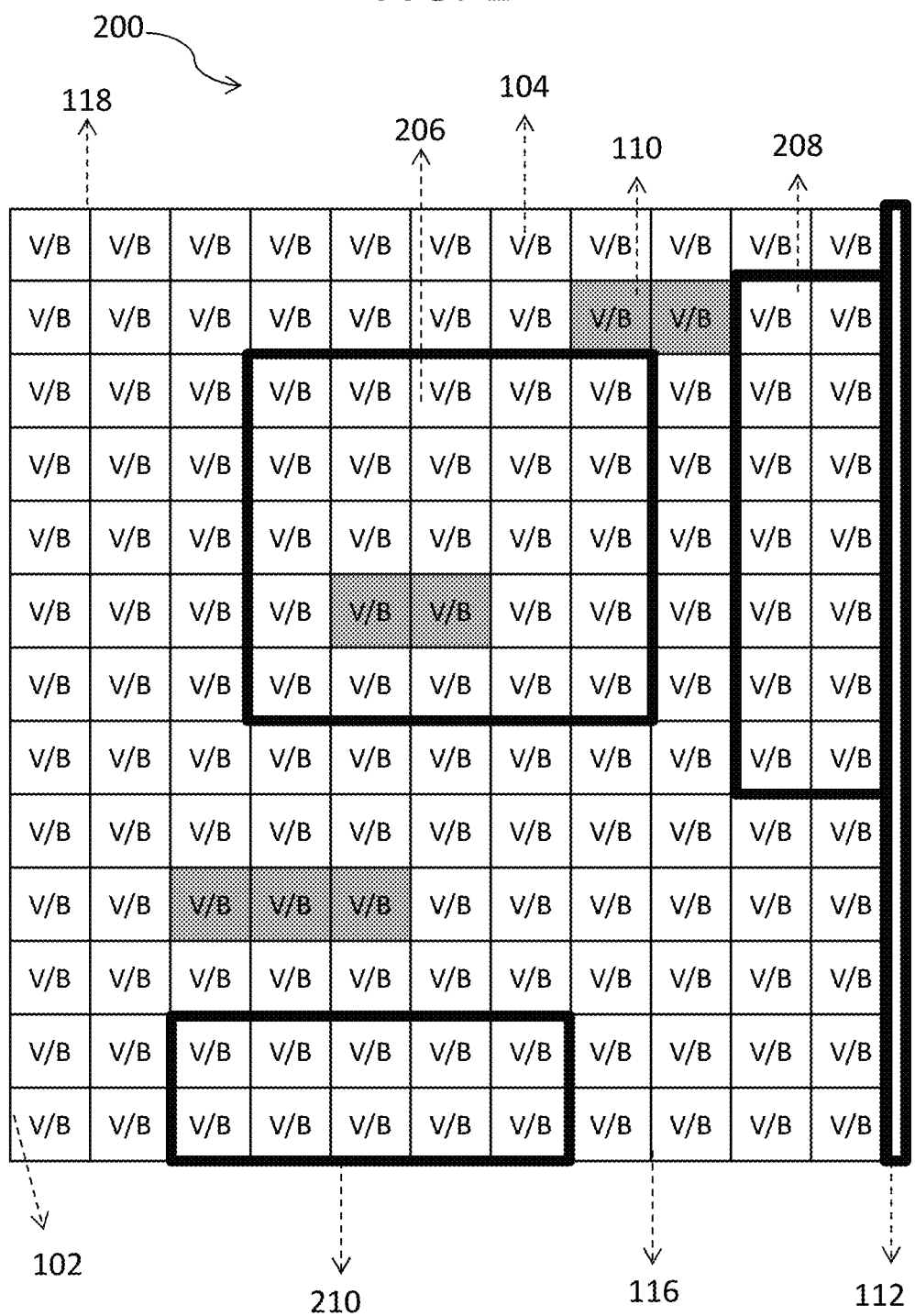
FIG. 2 is an illustration of an optimized planogram template built according to certain embodiments of the present disclosure.

FIG. 2 is an illustration of an optimized planogram 200. The optimized planogram 200 comprises a top 118, a bottom 116, a first side 102, and a second side 112 that may be generated using the planogram template in FIG. 1. The optimized planogram 200 comprises a plurality of positions (pegs) 104 plurality of regions that may include a target region 206 (within which may be describe an optimal location), an end cap region 208, and a lower region 210. The target region 206 may be similar to the target region 106 discussed in FIG. 1, and may comprise a plurality of positions 104 that may be considered preferred or premium positions and may or may not include locked positions 110. The target region 206, and/or other regions, may comprise a plurality of rules and constraints that are used when assigning cards to positions on the optimized planogram 200. A plurality of positions may be locked 110, as discussed above, based upon contractual agreements with the location where the cards will be displayed, or with the vendor/brand owner, or a combination of both. As indicated by the "V/B" on each card, each card comprises a plurality of information that may be associated with and/or visible on the face of the card and/or associated with an account that is associated with the card identification which may be a series of numbers, letters, symbols, or combinations thereof.

In one embodiment, the "V" represents the load value of the card and the "B" represents the brand. There may be additional information including category, sub-category, promotional/value differentiation opportunities, commission rate, performance history, predicted future long and/or short term performance, proximity information (to the closest potential point of sale using the card), and other information which may be referred to as factors. The assignment of positions may be performed according to embodiments of the present disclosure.

Figure 3:
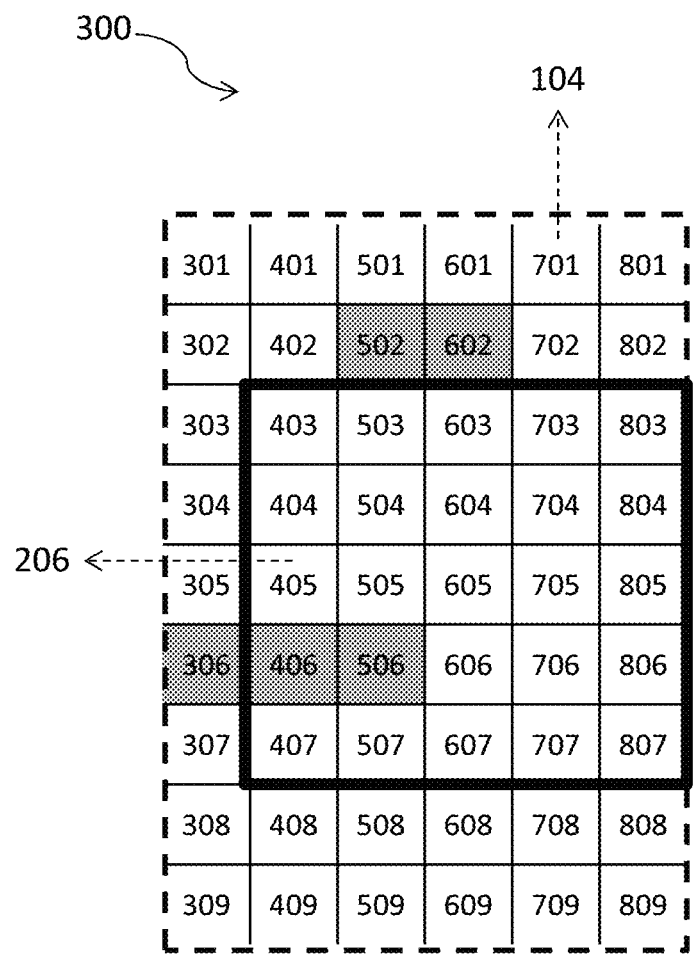
FIG. 3 is a section of the optimized planogram template of FIG. 2.

FIG. 3 is a section of the optimized planogram of FIG. 2. Section 300 comprises a plurality of positions 104 that have been assigned as indicated by the 30×, 40×, 50×, 60×, 70×, and 80× indications in each position 104. It is appreciated that the numbers are intended to indicate the filled positions were chosen for the ease of describing the assignment of positions and do not indicate any associated value or other attribute of the actual card assigned to the various positions 104 in the section 300. Target region 206 is featured in the section 300. The target region 206 as discussed above may have a plurality of rules or constraints associated with it. In some embodiments, a plurality of rules and/or constraints to the individual card positions as assigned or as unassigned based upon at least one of the vendor's contract/preference, the distributor's method, and the store or other location where the card display is to be located. In some embodiments, these may be referred to as "locked" positions, and in other embodiments, the rules and/or constraints are associated with positions based upon what is placed in adjacent positions. In still other embodiments, a planogram template may have a plurality of rules and/or constraints associated with the template as a whole and/or as applied to a plurality of regions which may include the target zone 206.

Figure 4:
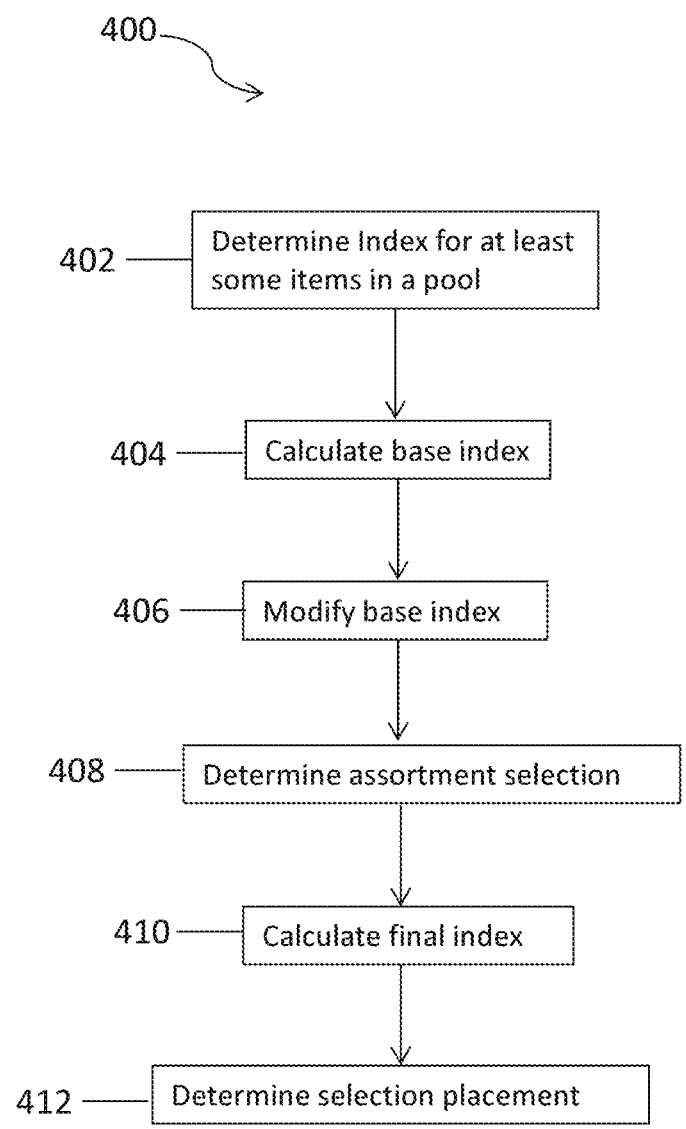
FIG. 4 is a flowchart of a method of assigning a plurality of items to a planogram template according to certain embodiments of the present disclosure.

FIG. 4 is a flowchart of a method 400 of assigning a plurality of items to a planogram template. In the method 400, an index is determined for at least some items from a pool of items at block 402. In some embodiments, an index may be determined for all of the items in a pool, depending upon the size of the planogram template and/or store display that is to be used. These items may be prepaid cards or other items that are sold in online and retail store locations. Depending upon the embodiment, the index may be determined at block 402 in a single step or in a plurality of steps.

In one embodiment, at block 404, an analysis may be used to calculate a base index. This analysis may comprise selection of a plurality of factors and a calculation. These factors may comprise a number of units sold at a plurality of calendar intervals, for example, at 13, 26, and 52 weeks respectively, the load value associated with the number of units sold at the plurality of calendar intervals, and a net revenue of the number of units sold at the plurality of calendar intervals. A load value comprises the value associated with a pre-paid (single use or refillable) card, that is, the value on the face of the card. The net revenue is the revenue generated for the sale of the card, e.g., a $100 load value card may have a 10% commission, which may be split between the entity who owns the card brand and the distribution partner. In some embodiments, the plurality of calendar intervals may comprise 13, 26, and 52 weeks, and in alternate embodiments there may be more or less intervals of longer or shorter duration.

At block 406, the base index may be modified using additional factors. The base index number may be modified at block 406, for example, for new or re-introduced products, or due to state legal restrictions, or based upon estimated future growth or contraction of the brand or category which may be referred to as a "lift factor," and/or based upon a new product index to an existing product, a current planogram-ed store count, a store-level mapping and associated mappable flag, proximity weighting tables, a score override feature, and a previous performance (card sales) history. The current planogram-ed store count comprises a number of stores in which a particular product is placed onto a planogram during a particular period of time.

It is appreciated that the same planogram template may be used in multiple display locations but also that a plurality of display locations that may be owned by the same enterprise or brand within an enterprise may receive different optimized planograms. This may be, for example, because of the proximity of points of use (sale) related to the different brands, because of seasonal or cultural differences of an area surrounding the store, and/or because of previous purchase histories or socioeconomic data associated with a display location.

Turning back to the factors that may be selected and employed as discussed herein, the proximity weighting table may be a table that references the store-level mapping (i.e. the store location distance, the distance between the display location and each brand's retail location, where applicable) in order to determine the nearest location where a particular card can be redeemed. For example, if a particular Italian restaurant chain does not have any locations within 500 miles of a display store location, the proximity weight for those cards may be zero or may be a negative factor. Accordingly, cards for that chain may not be selected for assignment. Conversely, if a particular sporting goods store has 5 locations within a 20 mile radius of a display store location, the proximity weighting for those cards may be comparatively higher. If a card is associated with a brand that has an online purchasing option, a proximity weighting may also be employed as an influencer. In some embodiments, this proximity weighting may be the highest weighting since the desirability of some goods and services may be increased if the goods and services can be purchased or used online. In some embodiments, this proximity weighting may be the lowest weighting since the desirability of some goods and services may be decreased if the goods and services can be purchased or used online. In other embodiments, this proximity weighting may be a neutral or mid-range weighting since the desirability of some goods and services may be substantially unaffected if the goods and services can be purchased or used online. The weightings may comprise a multiplication factor, addition factor, subtraction factor, division factor, or combinations thereof depending upon the embodiment.

In some embodiments, the state legal restrictions referenced above may comprise regulations such as what cards can be sold in a state based upon what retailers are present in that state, or in response to any local, state, or other regulatory requirements that may apply to certain types (categories or sub-categories) of retailers. Turning back to the factors, the lift factor may be based upon business conditions in a particular category, press related to particular brands, business health of a particular brand, new product launches, product recalls, cards being phased out, new card rollouts, or other events that may increase or decrease the sales or urgency for sale (i.e. brand obsoleting) of a particular card. The lift factor may be positive or negative.

The score override feature may be utilized, for example, if there is a special weighting that is contractually or otherwise applied to the index. This special weighting may be utilized for product testing, inventory clearance, or other needs as appropriate. The previous performance history of a card is the sales history for that card over at least a portion of the card's sales. This may be based upon the card's load value, brand, category, and sub-category—i.e. be a relative performance in each of those areas or a combined score from at least some of those areas—or may be based upon the sales history for the card without comparing it to other cards of similar value, brand, category, or sub-category. In some embodiments, the score override feature generally allows for a manual option that may be predicated by an automated check or review.

Turning to the block 408, determining the assortment selection, at least some of a plurality (pool) of items is selected for at least some of the pegs on the planogram template. All of the items of the plurality of items may or may not be assigned to a particular planogram template. In some cases, a subset (i.e. an assortment) may be selected based upon the base index or the modified base index associated with each card, a second-facing logic, a number of pegs per category in a region of a template or in an entire template, a manual placement option that may be based, for example, on contractual agreements, a predetermined minimum or maximum number or percentage of pegs for a brand per category, current planogram models, success of current planogram models, and the type of release associated with the card. The release type of the card may also be used at block 408 to determine the selection for the assortment. The release type may comprise an indication of whether a product is new, existing, or will be phased out within a predetermined time period.

At block 410, an analysis may be performed to determine final index that comprises a selection of a second set of factors and a calculation. Some of those factors that may be employed at block 410 comprise the product selection at block 408 (i.e. how desirable/likely to sell is the product?), product attributes such as the category, the sub-category, the load value, the form of value, and other attributes and factors as discussed above. In some embodiments, in addition to the above factors, heuristic graphs may be used which show experienced-based techniques for problem solving, such as where products may be best located. Further, in some embodiments, parallelization may be used to more efficiently and/or quickly perform a task, e.g., predicting the location of a product based on analyses and/or calculations concerning a similar product. There may also be user-defined category dimensions and space dimensions as well as fixture (position) attributes including strike-zone identification by individual peg or by row/column position. That is, the strike zone may be identified by a single peg, by a range of pegs identified by row and/or column position, or with reference to a plurality of pegs, or combinations thereof. In some embodiments, there may be multiple strike zones depending upon the configuration of the display and/or the location of the display. For example, a display in a location frequented by families, the display may comprise a strike zone for adults, a strike zone for teenagers, and a strike zone for children.

In an embodiment, the "user" discussed herein may comprise the distribution partner, the owner of the store where the display is located, or a combination of both and/or other third parties. In addition, the product placement in relation to other cards that have been placed may impact the final index, as may the aggregated index value that may be determined by brand. This value may also be determined by row, column, or zone/region. As discussed herein, each planogram template may comprise a plurality of regions that may be premium, discount, and other regions that may be location-based and which may impact a final index value for a prepaid card or other item.

At block 412, the placement of at least some of the items selected at block 408 on the planogram template to generate the optimized planogram may be determined. This placement (assignment) generates the optimized planogram that can be used in a plurality of displays online and in store locations worldwide. The placement of the items may take into account not only the final index resulting from the analysis at least at block 410 but also the overall product mix which may be weighted more heavily than placement/position of individual products. In some embodiments, there may be a preference for vertical placement as oppose to horizontal, diagonal, or clustering, which may also be preferred in some embodiments. A plurality of brand groupings may be determined for cards and each brand grouping may be ranked, for example, by a performance history and/or a load value (total or average) of the grouping. In an embodiment, positions on the planogram template may be filled from the spaces nearest the top of the planogram template, e.g. 118 in FIG. 2, and similar brands may be grouped based upon one or more sub-categories. The best-performing brands and cards (i.e. cards that may be high-performing but not necessarily associated with an overall high-performing brand) based upon at least one of the base index, modified index, and final index may be placed in the target zone 206 in FIG. 3.

Turning back to FIG. 3, the target zone 206 comprises a plurality of filled positions, including position 605 in the center and adjacent positions filled by cards 504, 604, 704, 705, 706, 505, and 506. Those adjacent positions may have been filled based upon the pluralities of rules, factors, and constraints discussed above. For example, if the position 605 is associated with Shoes, Inc., in the fashion category, in the footwear sub-category, there may be contractual restrictions on placing any cards associated with Shoes-4-U, Co. near position 605. Conversely, there may be a preference for a brand grouping, contractual, calculated, or a combination, where Socks, Inc. and/or Sports Apparel, Inc.'s cards may be placed in the adjacent spots.

In an embodiment, position 506 is a locked position, a locked position may be one that has been contractually reserved or that is specific to a particular template, display location, season, or combination of factors. Position 406 may comprise another locked position, which may have been locked for the same reasons as block 506 or for different or additional reasons. In some embodiments, the positions adjacent to block 605 may also be considered a brand grouping as discussed above, depending upon the brands, categories, and/or sub-categories associated with the brand.

Turning to FIG. 5, a system 500 comprises a plurality of servers 502, some or all of which may comprise one or more applications 512. In an embodiment, some or all of the plurality of servers 502 may comprise cloud storage systems. The plurality of servers 502 may represent servers associated with the vendors of a plurality of items such as prepaid cards, as well as those vendors including online vendors associated with display locations, and other entities that may provide relevant information to the process of selecting factors for analysis to generate optimized planograms. The system 500 is a dynamic system, that is, the data employed by the system 500 may be updated on an ongoing basis as new products are introduced and as sales are made. Therefore, when the analyses herein are performed, the analysis may be performed on initial performance data (from product introduction through a predetermined time period), or on a subset of the existing data, i.e. the analyses used to generate the base, modified, and final index may be based upon data up to and including current sales as to ensure that the performance history, market conditions, season, and other time-affected factors are correctly reflected.

The application 512 is illustrative of an application that receives information regarding new products from online and in-store (retail and wholesale) vendors and that receives sales information from display locations, depending upon the type of server that the application 512 is located on. This application 512 may be in communication with a server 504 associated with the distribution partner that generates the planogram maps and with a plurality of data stores 510 that are on the distribution partner server 504. The application 512 may push information to the distribution partner server 504 in response to a plurality of triggers or automatically. The triggers may include scheduled intervals of time, sales, product introduction, product obsoleting, product testing, or based upon a set of rules, or manually, or at the request of the server 504. In some embodiments, a combination of triggers may be utilized.

In one embodiment, an application 506 on the distribution partner server 504 sends a request to the application 512 for updated information, and the application 512 determines if there is information to send based upon, for example, the set of rules. If there is information to send, the application 512 may send that information to the application 506 or directly to the plurality of data stores 510. The plurality of data stores 510 comprise information such as a plurality of planogram templates and a plurality of items that may be placed on some or all of the plurality of planograms. An application 508, which may be referred to as the indexing or assignment application 508, may also reside on the distribution partner's server 504. The assignment application 508 may comprise a single application or may refer to a group of applications that select the factors/modifiers and perform the analyses that generate the base, modified, and final indexes, apply planogram template rules, and ultimately generate a planogram template and assign positions for specific items (cards) as discussed herein.

Figures 6B, 6C:
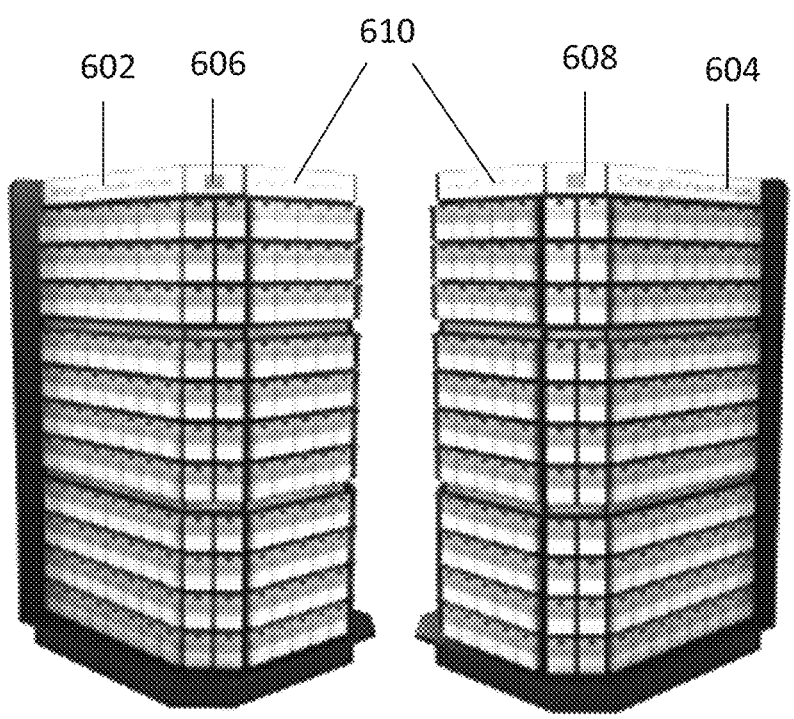
FIGS. 6B and 6C are isometric illustrations of an end-cap display according to certain embodiments of the present disclosure.

FIG. 6A is an illustration of an end-cap display according to certain embodiments of the present disclosure. FIGS. 6B and 6C are isometric illustrations of an end-cap display according to certain embodiments of the present disclosure. The end-cap display 600A comprises a plurality of sections. The plurality of sections should not be confused with the regions discussed herein, the regions are areas on a display that can be arranged in various formats, and that can be moved without any physical rearrangement of the display structure. In contrast, the plurality of sections are physical sections of a display that may utilize a breakdown of the physical structure in the event that a section or sections need to be rearranged or replaced with another section of a different size/shape. A first panel 602 that may be referred to as a left panel 602. The first panel 602 may be adjacent to a second panel 606 which may be referred to as a first bevel panel 606 or a left bevel panel 606. The first bevel panel 606 is the transitional panel between the first panel 602 and a center panel 610. FIGS. 6B and 6C are isometric views of an assembled end cap display that may be similar to the display 600A in FIG. 6A. As seen in FIG. 6B, the first panel 602 may be on the left side of a display, i.e., on the side where an aisle may begin. Also as seen in FIGS. 6B and 6C, the center panel 610 faces what may be a high traffic area which customers encounter when they are entering the retail location or when they are shopping or browsing. A second bevel panel 608 may be the transition panel between center panel 610 and second panel 604, which may also be referred to as the right panel 604 as illustrated in FIGS. 6, 6B, and 6C.

In some embodiments, a strike zone 612 may be utilized in order to maximize sales. The target region 206 discussed above in FIGS. 1, 2, and 3 may include this strike zone 612. The strike zone 612 may run from the first panel 602 through panels 606, 610, 608, and 604. In alternate embodiments, the strike zone 612 may run through/between less than all of the panels on a particular display.

FIG. 6D is an illustration of an embodiment of an optimized planogram according to embodiments of the present disclosure. FIG. 6D shows optimized planogram for an end-cap 600B, which may be similar to the optimized planogram 600A in FIG. 6A. The end-cap display 600B comprises a plurality of sections. As discussed in FIG. 6A, the first panel 602 may be referred to as the left panel 602. The first panel 602 may be adjacent to the section 606 which may be referred to as the first bevel panel 606 or the left bevel panel 606. The first bevel panel 606 is the transitional panel between the first panel 602 and the center panel 610. The second bevel panel 608 may be the transition panel between center panel 610 and the second panel 604, which may also be referred to as the right panel 604 as illustrated in FIGS. 6B, and 6C.

The sections discussed above may be divided into a plurality of regions 614. In FIG. 6D, the plurality of regions 614 are divisions of the sections discussed above in FIGS. 6A-6C. In some embodiments, the plurality of regions 614 may be separated by panel, and in other embodiments the regions may span more than one panel in length and/or width. In an embodiment, as illustrated in FIG. 6D, the plurality of regions 614 may comprise Home, Entertainment, Fashion, Dining, Telecom, and "Anywhere Gift," which may indicate a card issued by an entity such as a bank and/or a credit/debit card provider. Region 616 may be referred to as a Dining region and is discussed in detail below in FIGS. 7A-7C.

FIGS. 7A-7C comprise examples of the selection, analysis, and assignment, of a plurality of items to a planogram template to create an optimized planogram according to embodiments of the present disclosure. FIG. 7A is an illustration of a table 700A for the "Dining" category. The table 700A lists product scoring for a plurality of products 702, including the brand and value of each product (item), a separate brand listing 704, a final index value (CPI Scores) 706, and a placement 708 position ("peg") on a portion of a planogram template. These final index values may be determined according to the systems and methods disclosed herein. In some embodiments a segmentation tree may be used which illustrates how consumers shop various segments.

FIG. 7B is a table for the brand (product family) scoring for the plurality of items in FIG. 7A. The table 700B comprises the brand listing 704, an aggregate score 710 that is the sum of the scores of the items in table 700A for each brand 704. Table 700B may also comprise a priority 712 ("ACP Priority") that may be determined by the aggregate score 710. A product count 714 may reflect how many cards/brand are selected for placement in a given planogram template, section, or region of a template. The placement 708 positions listed in 700A and 700B are reflected in FIG. 7C.

FIG. 7C is an illustration of a portion of an optimized planogram that according to embodiments of the present disclosure. The plurality of products (items) discussed in FIGS. 7A and 7B are assigned to positions 708 as indicated. The row and column numbers discussed herein, for example, in FIGS. 6A-6D, are illustrated in FIG. 7C as well as "X-Y" indications underneath the product indication. For example, position F comprises the product "ScottBrews Multipack 15," which may comprise a plurality of $15 cards for the brand ScottBrews, and position F may be in row 9, column 1. In the example in FIGS. 7A-7C, the product assortment selection may be based on the final index value and the second-facing logic discussed herein. The products of the top-rated brand of the brands 704, determined by the aggregate score 710, on to what may be referred to as "prioritized peg spaces," e.g., the positions closest to the strike zone as discussed herein.

Figure 8:
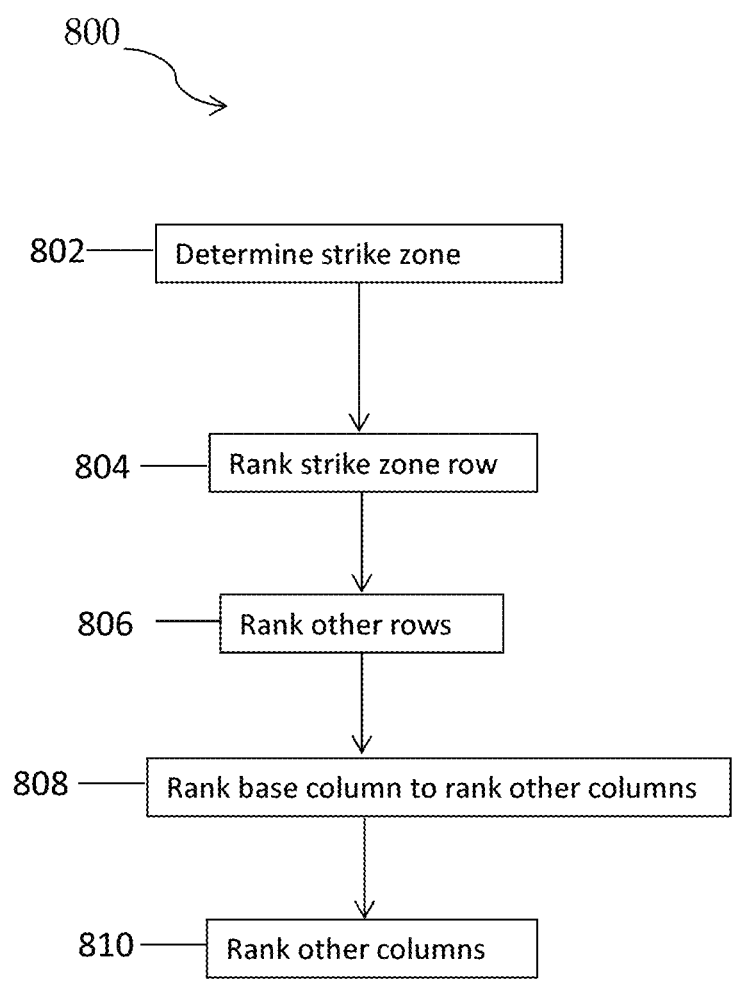
FIG. 8 is an automated method of selecting and assigning products to a planogram template according to certain embodiments of the present disclosure.

FIG. 8 is a method of establishing rankings for pegs (comprising rows, columns, or other areas of a planogram template) on a planogram template according to embodiments of the present disclosure. The above FIGS. 1-5 discuss the placement of items on a planogram template. In some embodiments, retail locations may have particular planogram templates or pools of templates assigned by region or division. However, in alternate embodiments, there may be a selection of a planogram template which may include the placement of the strike zone 612. In method 800 at block 802, the selection process may include finding a row closest to a predetermined height where the strike zone 612 may be placed. In some embodiments, this predetermined height may be 5'2" and in other embodiments, for example, in a children's store or near a sports training facility (i.e., where consumers may be taller or shorter than the average consumer), the predetermined height may be higher or lower. At block 804, the rows may be ranked with the strike zone 612 acting as the base. In one example at block 804, the strike zone 612 is a row that may be identified with a rank of 01, the row above the strike zone 612 row may be ranked 02, and the row below the strike zone 612 may be ranked 03. At block 806, additional rows on the display may be ranked in this alternating fashion, in some embodiments, all rows may be ranked.

At block 808, base columns may be ranked; for example, the middle column of center panel 610 may be selected and ranked 01. In some embodiments, if there is no middle column, a column that is to the right of the center may receive the 01 ranking. At block 810, the remainder of the columns may be ranked in an alternating fashion between right and left columns. In some embodiments, the row and column rankings may be utilized for card placement, and the row ranking (lower rankings may be more desirable for placement) may be utilized in favor of the column ranking. In an embodiment, the optimized planogram(s) generated by the method 800 may be used to assign a pool (assortment) of products and create an in-store or online display that may be further employed to gather data regarding sales, movement (traffic and actual removal of cards from the display, e.g., if a card is removed in a store display or selected in an online display and then subsequently purchased or returned/removed from the online selection/basket), and other data as discussed herein. This dynamically collected data may be employed to further modify the optimized planogram, that is, to further optimized the planogram templates by revising at least the information (product attributes, index values, selected factors, etc.), and/or to generate new optimized planograms as well as models for in-store and online testing.

FIGS. 9A-9C are portions of a calculation for a method according to embodiments of the present disclosure that may be used as part of the analysis to determine an index value for a prepaid card that may be similar to the final index value discussed in FIG. 4. The index values including the final index value may be referred to as a "CPI"—a calculated performance index. In FIG. 9A, at block 902, a plurality of store-level inputs are selected for a particular pre-paid card, these inputs may be referred to as Performance Value Inputs. The particular pre-paid card used as an example in this calculation may be associated with at least a brand and a category, the values, brand, and category that may be similar to those discussed in FIG. 4. In other embodiments, the item may be a good or service other than a pre-paid card. The values selected at block 902 may comprise the unit sales (number of pre-paid cards sold), load value of those sales, and gross profit of those sales. In an embodiment, each value may be measured at intervals of 13, 26, and 52 weeks. At block 904, the values selected at block 902 may be weighted, In FIG. 9B, a plurality of division-level metrics may be selected, including the unit sales, load value sales, and gross profit, which may each be calculated at intervals of 13, 26, and 52 weeks. In an embodiment, the values selected may be referred to as Performance Value Inputs. It is appreciated as discussed above that a "division" as used herein may refer to any level of an organizational entity, from a single store, to a region, to a subsidiary, or to the entire entity—this determination may be dependent on several factors including the size of the organizational entity, and may be established and defined through a contractual relationship. At 908, an analysis may be performed that may comprise weighting the values determined at 906. The weights used in this example at blocks 908 and 904 are illustrative, the weights in other embodiments may be different, higher, lower, and may exceed 100%.

In FIG. 9C, at 910, the values for store-level sales for the category associated with the pre-paid card in this example (and from blocks 902-908) are determined. Those category values are determined at the store level, may be referred to as Total Category Performance Value Inputs, and the values may comprise unit sales, load value sales, and gross profit, and may be measured at intervals of 13, 26, and 52 weeks. At block 912, the category performance for the division is generated based upon values such as unit sales, load value sets, and gross profit, and may be measured at intervals of 13, 26, and 52 weeks.

In FIG. 9D at block 914, an analysis may be performed comprising weighting the store index and the division index determined from blocks 902-908. These weightings may be 40% and 60% as indicated in FIG. 9D, or may be different values depending upon the prepaid card and associated category for which the index is being determined. After the weighting is applied, an initial index (CPI1) is generated for each of the store and the division indexes. In some embodiments, a blended index may be determined from these values, and in still other embodiments, a growth rate may be applied and a modified store index and division index may be determined (CPI2). This growth rate may be similar to the lift factor discussed in FIG. 4. In some embodiments, a proximity weighting as discussed herein may be applied to the modified store index, which may be blended into a second blended index prior to the proximity weighting being applied, to generate a final index for the prepaid card (CPI 3). In alternate embodiments, the blended CPI may be the final index, and in still other embodiments the modified (CPI2) indexes may be blended into a blended modified index and this may be referred to as the final index.

A method, implemented at least in part by a computing device, for determining an optimal set of products to be carried for a product assortment and generating an optimal planogram, the method comprising: receiving one or more objectives; receiving one or more constraints; receiving a plurality of dimensions and a plurality of hierarchies; transforming the plurality of dimensions and the plurality of hierarchies into a plurality of structural graphs of cells; generating a dynamic model using, at least one of the one or more objectives, the one or more constraints, the plurality of dimensions, and the plurality of hierarchies; performing an optimization run using the dynamic model; and outputting results of the optimization run. In an embodiment, the computing device may comprise a personal computing device, mobile phone, tablet, cloud storage system, online storage medium, or combinations thereof.

In an embodiment, the method further comprises: creating heuristic graphs, wherein the heuristic graphs are used for parallelization, and generating a set of decisions based on at least the results of the optimization run.

In an embodiment, the results of the optimization run comprise: an optimal set of products selected for the product assortment, wherein the optimal set of products is selected from a list of possible products; and wherein an optimal location is associated with each product of the product assortment, wherein the one or more objectives comprises a rank objective, and wherein the one or more objectives comprises a revenue objective, and wherein the one or more objectives comprises a profit objective. In an embodiment, the method further comprising: wherein the one or more constraints permit a variable number of facings for the products, and wherein the results of the optimization run comprise the optimal planogram indicating, for each of one or more products of the product assortment, at least one of a location of the product; and a number of facings for the product, wherein the set of products comprises one or more avatar products, wherein each avatar product represents a plurality of products as a single entity.

In an alternate embodiment, method for determining an optimal product assortment and an optimal planogram template, the method comprising: receiving product attributes for a set of products; receiving merchant preference information for the set of products; receiving one or more objectives; receiving one or more constraints; generating a dynamic model using, at least in part, the one or more objectives, performing an optimization run using the dynamic model, wherein the dynamic model is based on preferred shopper eye contact location relating to a pegboard containing prepaid cards; and outputting results of the optimization run, wherein the results comprise an optimal planogram template for an optimal product assortment, wherein the optimal product assortment is selected from the set of products and a substantially similar assortment of products is displayed in a merchant location.

In an embodiment, the method further comprising wherein the product attributes comprise, for each product of the set of products: a margin, an expected sales, a rank; a number of facings, and a geo-location proximity to a merchant location to redeem the product, and wherein the product attributes for each product of the set of products comprise: a ProductId, a Margin, a Rank, a Geo-location for redemption of the product, a plurality of Facings, an ExpectedSalesUnit, a ProductType, a ProductValue; a UPC; a SKU; and a merchant preference.

In some embodiments, the method further comprising wherein the one or more constraints permit a variable number of facings for the products, and wherein the results of the optimization run comprise the optimal planogram indicating, for each of one or more products of the product assortment, at least one of a location of the product; and a number of facings for the product.

In an alternate embodiment method for assigning an assortment of products to a stored planogram template comprising:
receiving, by an application on a server, a stored planogram template of a plurality of stored planogram templates comprising a first assortment of products in association with a geometrical placement layout, a placement for the first assortment of products on a gift card display; storing, by the application, the planogram in a memory on the server, receiving, by the application, a user-defined assortment of products storing, by the application, a second assortment in the memory, modifying, by a processor which has read/write access to the memory, the stored planogram template by: removing, from the stored planogram template, products which are in the first assortment but not in the second assortment; adding, to the modified planogram template, products which are in the second assortment but not in the first assortment; storing the modified planogram template in the memory, generating, by the processor, a set of at least one segmentation tree which describes the relative geometrical placement of products in the stored planogram template according to several ordered category types, each category type corresponding to a level of said at least one segmentation tree, adding the new products to the modified planogram template using the generated set of at least one segmentation tree, wherein the products on the modified planogram template correspond to at least one objective, wherein the objective comprises at least one of a generation of increased revenue based on product data and a historical data regarding the profitability of said products, and wherein the modified planogram template is generated by a computer program according to a plurality of information including the product data to increase the projected revenue as compared the stored planogram template by a predetermined percentage, amount, or combination metric.

In some embodiments, the method further comprising wherein adding new products to the modified planogram template using the generated set of at least one segmentation tree further uses optimization criteria for placement and number of facings of products on the display, and wherein the ordered category types include at least a "business" type which defines several categories of business and a "brand" type which defines several brands of product associated with said business type.

In some embodiments, the wherein the modified planogram template is a different stored planogram template from which products which are in the first assortment but not in the second assortment are directly removed and to which products which are in the second assortment but not in the first assortment are directly added, and wherein generating said at least one segmentation tree includes: partitioning the different stored planogram template into several groups, wherein each group contains one or more pegs, and generating one segmentation tree for each group, wherein generating a segmentation tree comprises: determining, for each merchant, the group of available products; determining, for each available product, the number of required categories of products; for each available product and for each required category; and determining the corresponding values for each available product within each required category, wherein an available product that is not within one or more categories is assigned a value of zero for that category.

In an alternate embodiment, a method of delivering the location of a product of interest to a user with a mobile computing device, comprising: transmitting a first data set comprising a reference from a user history table to a product of interest bookmarked by said user; determining the proximity of said mobile computing device with a store having said product of interest; upon entry of said mobile computing device into said store, transmitting a second data set comprising a schematic diagram of said store and a planogram identifying a location of said product of interest on a display in said store; and displaying on a user interface the location of said product of interest in relation to said schematic diagram of said store, wherein the location of said product on said display is determined by product data including the distance from the store to redeem the product.

In an embodiment, a portable computing device such as wearable technology, mobile phones, tablets, or hybrid devices may be used to scan quick response (QR) codes of at least one product in a display. This scanned information may be presented not only to the portable computing device but may also be transmitted to a remote server or cloud computing device in order to gather information about which products are scanned, the position of the products scanned, and the sensors may be further employed as discussed herein to determine if scanned products are removed from the pegs, replaced on the pegs, or purchased. The planogram template selected for a particular display, and/or the product assortment, and/or the assignment of products to pegs may be updated in real-time based upon feedback from the sensors, thus further automating and optimizing the displays. For example, if sales of a particular brand geared towards winter sports decrease, as indicated by sensor feedback, during the latter part of winter in southwest display locations, at least one of a different or a modified planogram template may instead be employed during those latter summer months.

In an embodiment, the method further comprising: transmitting data representing a location of the mobile computing device in relation to said store, wherein the planogram identifies the location of all products on the display, and delivering planogram updates to the mobile computing device when there are changes to the planogram, wherein the changes to the planogram relate to changes in a plurality of available products, wherein the location of the product is determined by product sales information, and wherein the display is a virtual display and the product is a digital product.

In an alternate embodiment, a method for modifying a planogram template, comprising: identifying a location of each reader in a plurality of readers, wherein the location of each of the readers is determined using a location mechanism; identifying a read zone coverage area for each of the readers in the plurality of readers; modifying, using a processing device within the updating device, a planogram display with the location and wherein a read zone coverage area relative to a location for each of the readers in the plurality of readers; and determining a status of read zone coverage for the read zone coverage area based on the read zone coverage areas on the planogram template associated with each of the readers in the plurality of readers, wherein a report is provided based on the status of read zone coverage for the area, wherein the updating is based on a location of a plurality of radio frequency identification (RFID) readers or near-field communication (NFC) readers, wherein the location of each reader is determined using ultrasonic technology, wherein the location of each reader is determined using trilateration or quadlateration techniques In an embodiment, a computer-implemented method for generating a plurality of product placement scenarios, comprising: retrieving, from a layout database (which may alternatively be referred to as a data store) stored in a non-transitory memory on a computer system, a plurality of layout data comprising an arrangement of a plurality of products in a display area of a retail environment, wherein the arrangement includes peg locations in the display area; retrieving, from an inventory database stored in the non-transitory memory, a plurality of inventory data indicating at least some products (an assortment) of the plurality of products to be displayed in the product display area; retrieving, from a product database, a plurality of product data indicating for each of the products at least brand type, brand value data, and a product ranking among the products; generating a first product placement scenario in which each of the at least some products is placed at a particular peg location within the display area; generating a second product placement scenario for the at least some products wherein the at least some of the products are placed at a different peg location within the display area, wherein the second product placement scenario is based at least in part on determining an optimized product placement scenario based upon at least one of historical data from sensors and a plurality of selected factors associated with the products; and providing the optimized product placement scenario to the retail environment for display or reproduction in a tangible medium.

In an embodiment, the method further comprising, wherein the second product placement scenario is based at least in part on a flex factor that accounts for sales impact of one of the products into a proximate peg location, wherein the optimized product placement scenario is provided by transmitting said placement to the retail environment, and wherein the optimized product placement scenario is provided via use of a mobile device located at the retail environment.

In an embodiment, a retail system for evaluating and recommending planograms, comprising: a first computing system in communication with a telecommunications service provider's network and configured to receive and to transmit a plurality of planograms, each planogram being associated with one retail store of a plurality of retail stores and each being associated with a plurality of products to be displayed for sale at the associated retail store, and each planogram including data indicating threshold quantities of each product of the associated plurality of products; and a plurality of remote computing systems, wherein at least some of the plurality of the remote computing systems are in communication with the first computing system using the network, and wherein each remote computing system of the plurality of the remote computing systems is configured to receive, via the network, a plurality of planogram templates associated with a corresponding retail store, brand, retail chain, or combinations thereof.

In an embodiment, the system further comprising, wherein each planogram template of the plurality of planogram templates corresponds to one or more display fixtures, associated with the associated retail store, wherein each product of the planogram is assigned to a product position on the one or more display fixtures, and wherein the threshold quantity for each product comprises a minimum number of product units required to face the assigned product position.

In an embodiment, the system further comprising, wherein the plurality of remote computing systems comprise wireless computing devices, wherein the wireless computing devices are capable of overriding the planogram, and wherein, upon override, a revised planogram is generated based on the override, wherein the plurality of wireless computing devices provide information regarding the store location.

In an alternate embodiment, a method for collecting a plurality of data stored value cards on a retail display comprising: receiving electronic information transmitted from at least one device located proximate to a display, wherein such information is transmitted upon removal of a product from the display, wherein removal is determined by an at least one sensor in communication with a computer system comprising a non-transitory memory, wherein the at least one sensor comprises a receiver and a transmitter, wherein the receiver is configured to receive a plurality of unique card data for each card within range of the at least one sensor; wherein the at least one sensor further comprises a processor; wherein the receiver receives card information; wherein the card information is transmitted via the network to the computer system and stored in the non-transitory memory; determining, by the sensor, that a card previously within the range is no longer within range, and transmitting, in response to the determination, card information associated with the card previously within the range to a central processor, wherein the device is a sensor adapted to recognize removal of a card from a peg on a card display, and wherein said card information includes information regarding when a card no longer within the range of the sensor was first determined to be out of range of the sensor, wherein the sensor receives card information by RFID or NFC signals. The sensor may be located on a peg of the display and which may be referred to as a "smart peg," because information such as card removal and replacement may be tracked using the peg.

In an alternate embodiment, a method for generating a planogram that may be represented as a data file, the method comprising: receiving, at a remote computing device, first recorded position data for a first item available for location/assignment on a display fixture; generating, using the remote computing device, a planogram data file, by writing item data for a plurality of items to the planogram data file, wherein the item data includes a preference score; determining, based on the item data, a first maximum preference score for a first item of the plurality of items, wherein the first maximum preference score is greater than the preference scores for other items of the plurality of items; writing a plurality of fixture location data for the first fixture to the planogram data file, wherein the first fixture has assigned to it a first item based on a first maximum preference score; writing, based on the first recorded position data, first position data for the first item to the planogram data file; determining, based on the item data, a second maximum preference score for a second item of the plurality of items, wherein the second maximum preference score is less than the first maximum preference score; writing fixture location data for the second fixture to the planogram data file; wherein the second fixture has assigned to it a second item based on a second maximum preference score, wherein the first fixture has a more preferred location than the second fixture; and writing, based on the second recorded position data, second position data for the second item to the planogram data file, wherein the first recorded position data and the second recorded position data are received from a mobile communication device that recorded the first recorded position data and the second recorded position data.

In an embodiment, the method further comprising: recording the first recorded position data and the second recorded position data by scanning, using a barcode scanner operatively coupled to the mobile communication device, one or more first barcodes associated with at least one of the one or more first items; providing an indication that position data has been recorded for the first fixture; and scanning, using the barcode scanner, one or more second barcodes associated with at least one of the one or more second items, wherein recording the first recorded position data and the second recorded position data comprises: recording, using a camera operatively coupled to the mobile communication device, one or more first identifiers associated with at least one of the one or more first items; providing an indication that position data has been recorded for the first fixture; and recording, using the camera, one or more second identifiers associated with at least one of the one or more second items.

In an embodiment, the method, further comprising: receiving, by the remote computing device, a template planogram; and storing the template planogram in a database accessible to the remote computing device, wherein at least one of the first item data, the second item data, and the fixture data is based on data extracted from the template planogram.

There has been described herein methods and dynamic systems for planogram template selection and the generation of optimized planograms by optimized item assignment. It will be apparent to those skilled in the art that modifications may be made without departing from the spirit and scope of the disclosure. The embodiments described are representative only, and are not intended to be limiting. Many variations, combinations, and modifications of the applications disclosed herein are possible and are within the scope of the disclosure. Accordingly, the scope of protection is not limited by the description set out above, but is defined by the claims which follow, that scope including all equivalents of the subject matter of the claims.

What is claimed:

1. A physical, product display comprising tangible items for purchase, resulting from a processor executing an application stored in non-transitory memory, the application causing the processor to generate planogram map based on a first assignment of items which comprises:
  a plurality of items assigned to a first planogram template in the first assignment of items, wherein the plurality of items assigned were selected to be assigned to the first planogram template from a first plurality of items available for display, wherein the plurality of items assigned is a subset of the first plurality of items available for display;
  wherein the first planogram template is selected based upon at least one of a season, a display type, a display location, a number of items to display, and a predetermined occupation percentage,
  wherein the first planogram template comprises a plurality of regions, wherein at least one constraint on item assignment is associated with at least one region of the plurality of regions
  wherein each item is associated with an index, and wherein each item of the plurality of items assigned is associated with a category, a brand, and a load value,
  wherein the index is based upon a plurality of factors, wherein the plurality of factors comprises at least two of a number of units sold during a predetermined time period, a load value associated with the number of units sold during the predetermined time period, a net revenue associated with the number of units sold during the predetermined time period, a product commission, a product approval, and a regulatory restriction,
  wherein at least some items of the plurality of items assigned are assigned to the first planogram template of a plurality of templates based upon at least the index and a plurality of rules, and
  wherein the plurality of rules is associated with at least one of the first planogram template, the season, the display type, a position of at least one other item, the predetermined occupation percentage, and the display location; and
  wherein, based on dynamic feedback data received, in real time, from one or more sensors in the product display relating to prepaid cards removed from the product display, replaced on the product display and/or purchased, the product display, the first planogram template, or combinations thereof are updated by revising display information.

2. The physical display of claim 1, wherein the index is modified based upon at least one of a growth factor, a performance weighting, a proximity weighting, and an item release date.

3. The physical, product display of claim 2, wherein the proximity weighting is a weighting based upon a proximity of a redemption location for an item to a purchase location of the item.

4. The physical, product display of claim 1, wherein the predetermined occupation percentage is associated with at least one of the category, the brand, and the load value associated with each item.

5. The physical, product display of claim 1, wherein the first planogram template comprises a plurality of positions, wherein at least one position on the template is locked.

6. The physical, product display of claim 1, wherein at least one region is a target region, and wherein items with at least one of a high load value, the performance history, are placed in the target region.

7. The physical, product display of claim 1, wherein item assignment is further based on a predetermined card grouping based upon at least one of the category, the brand, and a sub-category.

8. The physical, product display of claim 1, wherein the plurality of categories comprises apparel, food, beauty, music, general use, department stores, and discount retailers.

9. The physical, product display of claim 1, wherein the at least one constraint is associated with at least one of the display location, a maximum number of positions, a minimum number of positions, and a relational constraint.

10. The physical, product display of claim 9, wherein the relational constraint determines what categories, brands, and load values are placed in proximity to other categories, brands, and load values.

* * * * *